US012126975B2

(12) United States Patent
Lee et al.

(10) Patent No.: US 12,126,975 B2
(45) Date of Patent: Oct. 22, 2024

(54) WEARABLE DEVICE AND METHOD FOR CONTROLLING AUDIO OUTPUT USING MULTI DIGITAL TO ANALOG CONVERTER PATH

(71) Applicant: Samsung Electronics Co., Ltd., Gyeonggi-do (KR)

(72) Inventors: Yonghoon Lee, Gyeonggi-do (KR); Jinyong Kim, Gyeonggi-do (KR); Kyoungho Bang, Gyeonggi-do (KR); Byeongmin Lee, Gyeonggi-do (KR); Jeock Lee, Gyeonggi-do (KR); Hangil Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 232 days.

(21) Appl. No.: 17/842,044

(22) Filed: Jun. 16, 2022

(65) Prior Publication Data

US 2022/0360897 A1 Nov. 10, 2022

Related U.S. Application Data

(63) Continuation of application No. PCT/KR2022/006490, filed on May 6, 2022.

(30) Foreign Application Priority Data

May 10, 2021 (KR) ........................ 10-2021-0060252

(51) Int. Cl.
*H04R 3/12* (2006.01)
*G10K 11/178* (2006.01)
*H04S 3/00* (2006.01)

(52) U.S. Cl.
CPC ......... *H04R 3/12* (2013.01); *G10K 11/17823* (2018.01); *H04S 3/008* (2013.01); *H04R 2205/022* (2013.01)

(58) Field of Classification Search
CPC ... H04R 3/04; H04R 3/12; H04R 3/14; H04R 2205/022; H04R 1/1083; H04S 3/008; G10K 11/17823; G10K 2210/1081
See application file for complete search history.

(56) References Cited

U.S. PATENT DOCUMENTS

| | | | | |
|---|---|---|---|---|
| 4,683,590 A * | 7/1987 | Miyoshi | H03H 21/0012 | 381/83 |
| 4,870,690 A * | 9/1989 | Negishi | H04R 3/04 | 381/103 |

(Continued)

FOREIGN PATENT DOCUMENTS

| | | |
|---|---|---|
| CN | 105959438 | 9/2016 |
| CN | 107948873 | 4/2018 |

(Continued)

OTHER PUBLICATIONS

International Search Report dated Aug. 22, 2022 issued in counterpart application No. PCT/KR2022/006490, 9 pages.

(Continued)

*Primary Examiner* — Jason R Kurr
(74) *Attorney, Agent, or Firm* — The Farrell Law Firm, P.C.

(57) ABSTRACT

A wearable device is provided and includes a plurality of speakers including a first speaker, a second speaker, and an $N^{th}$ speaker, a plurality of digital to analog converter (DAC)s including a first DAC connected to the first speaker, a second DAC connected to the second speaker, and an $N^{th}$ DAC connected to the $N^{th}$ speaker, an audio signal processing module including N DAC output paths configured to filter an audio signal according to each frequency band and output the audio signal, a memory; and a processor electrically connected to the plurality of DACs, the audio signal processing module, and the memory, wherein the memory includes instructions causing the processor to, when the (Continued)

audio signal is reproduced, analyze a frequency component included in the audio signal, activate the N DAC output paths when the frequency component included in the audio signal has a full band range, activate only a DAC output path for processing a specific frequency band among the N DAC output paths when the frequency component included in the audio signal has only the specific frequency band, and output the audio signal through a speaker connected to the activated DAC output path.

19 Claims, 7 Drawing Sheets

(56) References Cited

U.S. PATENT DOCUMENTS

| | | | | |
|---|---|---|---|---|
| 5,384,856 | A * | 1/1995 | Kyouno ................... | H04R 3/14 381/103 |
| 8,041,067 | B2 | 10/2011 | Yang | |
| 8,442,241 | B2 | 5/2013 | Yamada et al. | |
| 9,894,194 | B2 | 2/2018 | Macours | |
| 9,900,723 | B1 | 2/2018 | Choisel et al. | |
| 10,104,470 | B2 | 10/2018 | Kon | |
| 10,966,019 | B2 | 3/2021 | Zhang et al. | |
| 2003/0234734 | A1 | 12/2003 | Wouters | |
| 2007/0005161 | A1 | 1/2007 | Henson et al. | |
| 2014/0161279 | A1 | 6/2014 | Jones et al. | |
| 2018/0145697 | A1 | 5/2018 | Crespi et al. | |
| 2019/0239011 | A1 | 8/2019 | Chen | |
| 2021/0083838 | A1 | 3/2021 | Kang et al. | |

FOREIGN PATENT DOCUMENTS

| | | |
|---|---|---|
| CN | 110213695 | 9/2019 |
| CN | 111787442 | 10/2020 |
| JP | 11-016281 | 1/1999 |
| KR | 1020080099006 | 11/2008 |
| KR | 1020150116858 | 10/2015 |
| KR | 10-1606546 | 3/2016 |
| WO | WO 2014/125183 | 8/2014 |

OTHER PUBLICATIONS

European Search Report dated Aug. 28, 2024 issued in counterpart application No. 22807723.6-1207, 7 pages.

* cited by examiner

WEARABLE DEVICE AND METHOD FOR CONTROLLING AUDIO OUTPUT USING MULTI DIGITAL TO ANALOG CONVERTER PATH

CROSS-REFERENCE TO RELATED APPLICATION(S)

This application is a bypass continuation application of International Application No. PCT/KR2022/006490, which was filed on May 6, 2022, and is based on and claims priority under 35 U.S.C. § 119 to Korean Patent Application No. 10-2021-0060252, which was filed in the Korean Intellectual Property Office on May 10, 2021, the entire disclosure of each of which is incorporated herein by reference.

BACKGROUND

1. Field

The disclosure relates generally to a wearable device and a method of controlling an audio output using a multi-digital to analog converter (DAC) path.

2. Description of Related Art

An audio output device (e.g., a speaker) may include a full-range scheme for outputting an entire sound band through one speaker and a multi-way scheme for outputting a sound signal in divided two or more different bands such as high note and low note.

According to the recent development of sound technology, the multi-way scheme may be applied to a small wearable device (for example, an ear audio output device). For example, a wearable device including a two-way speaker having a low band and a high band may connect one DAC and two speakers, and design crossover through a passive element, so as to output a sound in divided frequency bands of respective speakers.

When a wearable device uses one DAC output path, it is difficult to individually optimize driving conditions according to speaker characteristics and accurately correct a phase difference between output paths, a delay degree, and an output level, thereby limiting improvement of the audio output performance.

SUMMARY

Ana aspect of the disclosure is to provide a scheme in which a wearable device including a multi-way speaker can variably control the audio output according to a driving condition of each speaker and a use scenario.

According to an aspect of the disclosure, a wearable device includes a plurality of speakers including a first speaker, a second speaker, and an $N^{th}$ speaker; a plurality of DACs including a first DAC connected to the first speaker, a second DAC connected to the second speaker, and an $N^{th}$ DAC connected to the $N^{th}$ speaker; an audio signal-processing module including N DAC output paths configured to filter an audio signal according to each frequency band and output the audio signal, a memory, and a processor electrically connected to the plurality of DACs, the audio signal-processing module, and the memory, wherein the memory includes instructions causing the processor to, when the audio signal is reproduced, analyze a frequency component included in the audio signal, activate the N DAC output paths when the frequency component included in the audio signal has a full band range, activate only a DAC output path for processing a specific frequency band among the N DAC output paths when the frequency component included in the audio signal has only the specific frequency band, and output the audio signal through a speaker connected to the activated DAC output path.

According to another aspect of the disclosure, a wearable device includes a plurality of speakers; a plurality of DACs; and an audio signal-processing module, wherein the audio signal-processing module is configured to process an audio signal, the audio signal being divided and output through a first DAC output path comprising a first band filter connected to a first speaker and a first DAC, a second DAC output path comprising a second band filter connected to a second speaker and a second DAC, and an $N^{th}$ DAC output path comprising an $N^{th}$ band filter connected to an $N^{th}$ speaker and an $N^{th}$ DAC, analyze a frequency component included in the audio signal, activate the N DAC output paths when the frequency component included in the audio signal has a full band range, activate only a DAC output path for processing a specific frequency band among the N DAC output paths when the frequency component included in the audio signal has the specific frequency band, and output the audio signal through a speaker connected to the activated DAC output path.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Various embodiments of the disclosure will now be described in detail with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Figure 1:
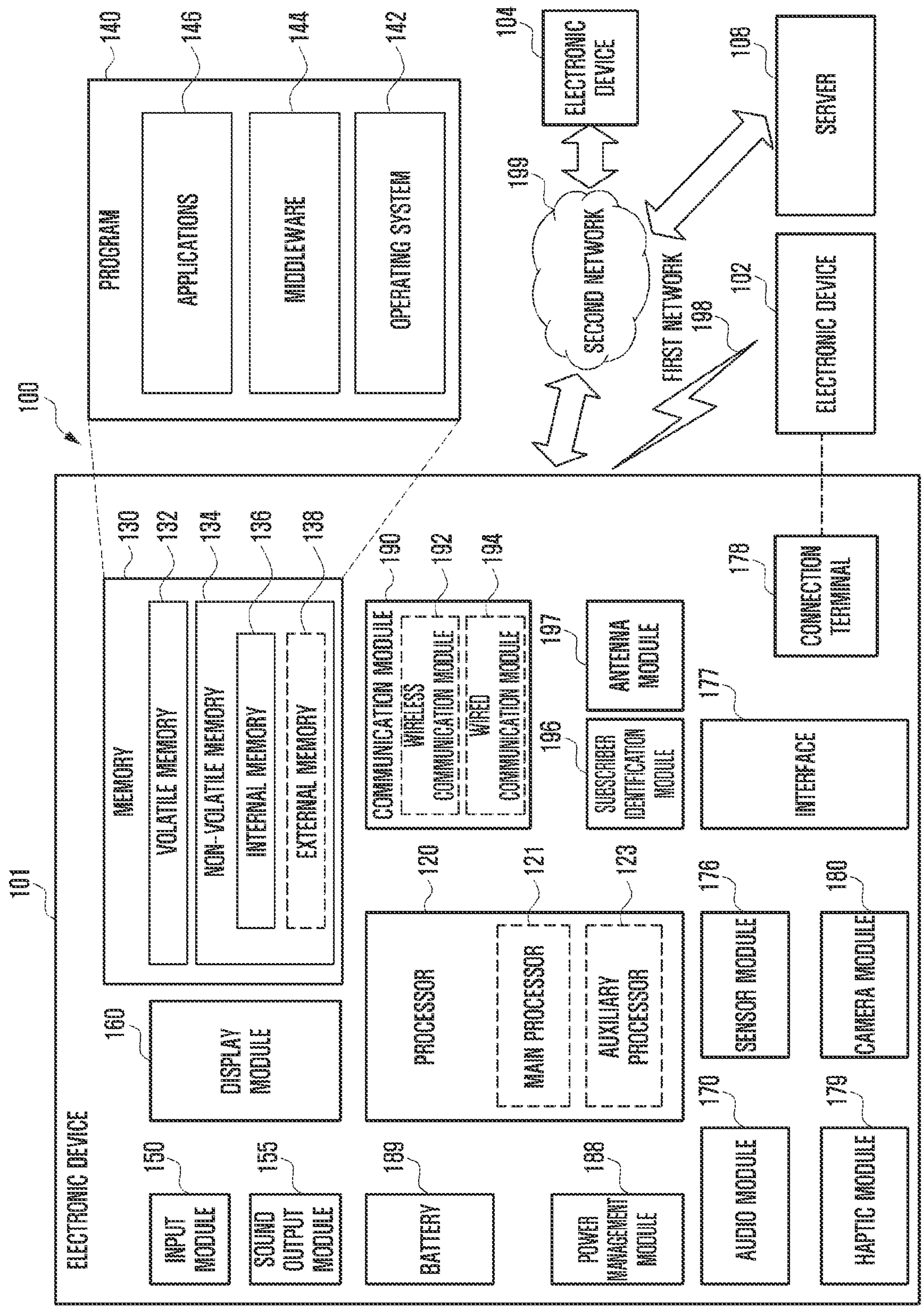
FIG. 1 illustrates an electronic device in a network environment, according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lams or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an MC disposed on a first surface (e.g., the bottom surface) of the printed circuit board, or adjacent to the first surface and capable of supporting a designated high-frequency band. (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIDI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Hereinafter, although a wearable device is described as an example, various embodiments may also be applied to an audio output device including a plurality of speakers.

Figure 2:
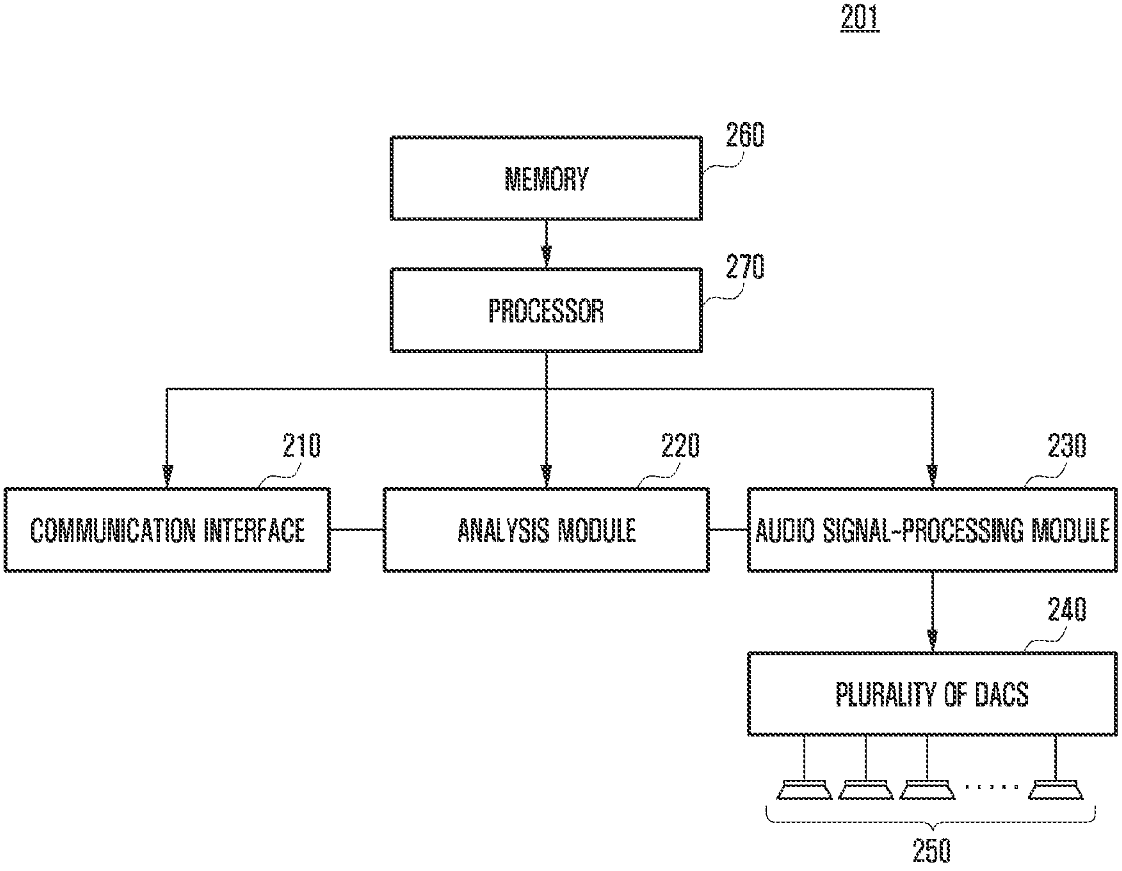
FIG. 2 illustrates a configuration of a wearable device, according to an embodiment.

FIG. 2 illustrates a configuration of a wearable device, according to an embodiment.

Referring to FIG. 2, a wearable device 201 (for example, the electronic device 101 of FIG. 1) may be implemented as a multi-way speaker system for outputting an audio signal in frequency bands divided (separated or sliced) to be suitable for respective speaker characteristics according to a use scenario and situation.

The wearable device 201 may include a communication interface 210, an analysis module 220, an audio signal-processing module 230, a plurality of DACs 240, a plurality of speakers 250, a memory 260, and a processor 270. The elements of the wearable device 201 may be operatively or electrically connected to each other. The wearable device 201 may include earphones, headsets, earpieces, ear buds, or a true wireless stereo (TWS) device.

The wearable device 201 illustrated in FIG. 2 shows a configuration of a single device. In the case of a TWS device operating as a set of two devices, a first wearable device and a second wearable device having a configuration which is the same as that illustrated in FIG. 2 may communicate with each other to operate.

The communication interface 210 may communicate with an external electronic device (e.g., an electronic device, a smart phone, a notebook, a TV device, or an audio source device) and transmit and/or receive an audio signal (for example, a digital audio signal, audio content, audio data, or an audio packet) to be output from an audio source (e.g., an external electronic device) to a plurality of speakers 250. The audio signal may include at least one of a voice signal or a sound source signal.

The communication interface 210 may support a direct connection or a wireless connection with the external electronic device. The communication interface 210 may include a connection terminal or a communication module. The connection terminal may include a connector (for example, an audio interface or an earphone connector) which can be physically connected to the external electronic device. The communication module may support a wired communication or wireless communication connection with the wearable device 201. The wearable device 201 may communicate with the external electronic device through at least one of Wi-Fi, Bluetooth™, BLE, or IR communication.

The analysis module 220 may analyze an audio signal provided from the external electronic device to determine an output path type and may select all or at least some of a plurality of DAC output paths connected to speakers that are required for audio reproduction.

The analysis module 220 may sample at least some of the audio signals (in other words, digital audio signals) to convert the same into audio signals of frequency components and identify (or detect) frequency components included in the audio signals. The analysis module 220 may determine whether the audio signal is an all-output path type or a partial output path type on the basis of the frequency component included in the audio signal.

The analysis module 220 may identify a reference frequency for dividing frequency bands according to performance of a plurality of speakers mounted to the wearable device 201 and divide the frequency components of the audio signals.

When the number of speakers is three, the analysis module 220 may identify a first reference frequency and a second reference frequency defined according to performances of the three speakers and divide frequency components included in the audio signals on the basis of the first reference frequency and the second reference frequency. The analysis module 220 may divide the audio signal into a first frequency component having a frequency band lower than the first reference frequency a low frequency band), a second frequency component having a frequency band between the first reference frequency and the second reference frequency (e.g., an intermediate frequency band), and a third frequency component having a frequency band higher than the second reference frequency (e.g., a high frequency band).

The reference frequencies may be based on performances (for example, a frequency band that can be reproduced) of the speakers mounted to the wearable device 201, and the range of the reference frequency may vary depending on the performance of the speaker to be applied. Further, the number of reference frequencies may vary depending on the number of speakers mounted to the wearable device 201. For example, when the number of speakers is two, frequency bands of the audio signals may be divided into two areas (e.g., a low frequency band or an intermediate/high frequency band) on the basis of one reference frequency.

The analysis module 220 may determine an output path type according to a frequency component detected from the audio signal. The analysis module 220 may determine the partial output path type when only the second frequency component is detected from the audio signal, and determine the all-output path type when each of the first frequency component to the third frequency component are detected from the audio signal.

The analysis module 220 may determine the output path type on the basis of type information transmitted from the external electronic device for providing the audio signal. The external electronic device may analyze a frequency component of an audio signal to be reproduced by the wearable device 201 and provide type information (for example, a high band type, an intermediate band type, a low band type, a low intermediate band type, and a full-range type) indicating a frequency band of the frequency component included in the audio signal to the wearable device 201. When the audio signal is a packet form, the audio signal may be inserted into a header part of the packet and provided. The type information may include at least one of frequency information, the number of channels, a sampling rate, or a bit rate.

The external electronic device may acquire operation mode information (for example, a voice call mode, a media playback mode, a noise canceling mode, and an ambient sound mode) between the wearable device 201 and the external electronic device.

The analysis module 220 may divide the output path types of the audio signals on the basis of the operation mode of the wearable device 201.

The operation mode of the wearable device 201 may include at least one of a media playback mode, a voice call mode, a noise canceling mode, and an ambient sound mode, but is not limited thereto. When the wearable device 201 operates in the voice call mode with the external electronic device, the analysis module 220 may recognize that the audio signal is a voice signal and determine the partial output path type. When the wearable device 201 operates in the media playback mode, the analysis module 220 may recognize that the audio signal is music content and determine the all-output path type. When the wearable device 201 operates in the ambient sound mode, the analysis module 220 may analyze ambient sound components and select the all-output path type or determine the partial output path type according to the ambient sound components. The analysis module 220 may select the DAC output path corresponding to at least one speaker to output the audio signal according to the output path type of the audio signal and activate (or enable) the selected DAC output path.

When the frequency component included in the audio signal is a first frequency component, the analysis module 220 may select and activate a first DAC output path including a first band filter for filtering a signal equal to or lower than a first frequency band. When the audio signal includes frequency component of all frequency bands, the analysis module 220 may select and activate all DAC output paths including a second band filter to an $N^{th}$ band filter as well as the first DAC output path including the first band filter.

A switch for controlling activation or deactivation may be disposed in each DAC output path. The wearable device 201 may block power supply to deactivate the DAC output path according to the control of the processor 270.

The analysis module 220 may be included in the audio signal-processing module 230.

The audio signal-processing module 230 may process an audio signal the form that can be output through the speaker on the basis of the DAC output path activated by the analysis module 220.

The audio signal-processing module 230 may change a sampling rate for one or more digital audio signals, apply one or more filters, processing interpolation, amplify or attenuate all or some frequency bands, processing noise (e.g., attenuate noise or echo), change a channel (e.g., switching between mono and stereo), perform mixing, or extract a predetermined signal.

The audio signal-processing module 230 may filter and output audio signals to be separated for respective frequency bands corresponding to the performance of respective speakers by using a plurality of crossover filters. The crossover filters may include at least one of a high pass filter (HPF), a band pass filter (BPI), a low pass filter (LPF), and a band stop filter (BSF). The HPF may pass and output only signals in a frequency higher than or equal to a specific frequency (for example higher than or equal to 600 Hz or 10 kHz corresponding to high notes) among the input audio signals, and the BPF may pass and output only signal in a frequency within a specific frequency band (for example, 600 Hz or 100 Hz to 10 kHz corresponding to middle notes) among the input audio signals. The LPF may pass and output only signals in a frequency lower than a specific frequency (for example, equal to or lower than 600 Hz corresponding to low notes or equal to or lower than 100 Hz) among the input audio signals, and the BSF may block only frequency signals within a specific frequency range and pass and output signals in other frequency ranges among the input audio signals.

The plurality of DACs 240 may be configured to convert an audio signal filtered for each frequency band (in other words, a digital audio signal) into an analog digital signal.

In the plurality of crossover filters, the plurality of DACs 240, and the plurality of speakers 250, one path may configure a plurality of DAC output paths independent from each other. For example, a first band filter may be connected to a first DAC and a first speaker to configure a first DAC output path, a second band filter may be connected to a second DAC and a second speaker to configure a second DAC output path, a third band filter may be connected to a third DAC and a third speaker to configure a third DAC output path, and an $N^{th}$ band filter may be connected to an $N^{th}$ DAC and an $N^{th}$ speaker to configure an $N^{th}$ DAC output path. The first band filter may perform filtering to make a signal equal to or lower than a low band frequency band (for example, equal to or lower than 100 Hz), the second band filter may perform filtering to make a signal in a frequency band of a specific band (e.g., 100 Hz to 9 kHz), and the third band filter may perform filtering to make a signal in a high band frequency band (e.g., higher than or equal to 9 kHz). The $N^{th}$ band filter may be implemented as a filter in a range which does not overlap the first band filter to the third band filter or a filter at least partially overlapping them.

The plurality of DACs 240 may output audio signals amplified through the amplification circuit to the plurality of speakers 250. The plurality of speakers 250 may convert the analog audio signal transmitted through each DAC output path into a sound wave and output the sound wave.

The plurality of speakers 250 may be connected to the plurality of DACs 240. The plurality of speakers 250 may be disposed at locations facing different directions. The plurality of speakers 250 may output signals in different frequency bands. The plurality of speakers 250 may be speakers having different driving conditions.

The plurality of speakers 250 may include a first speaker, a second speaker, and a third speaker, but are not limited thereto, and may further include a fourth speaker connected to the first speaker and a fifth speaker connected to the third speaker.

The processor 270 may perform data processing for the operation of the wearable device 201 and control the signal flow between internal elements of the wearable device 201. The memory 260 may be operatively connected to the processor 270 and may store various instructions that can be executed ley the processor 270 or the audio signal-processing module 230.

The processor 270 may control the connection with the external electronic device through the communication interface 210, control processing of the audio signal transmitted from the external electronic device through the analysis module 220 and the audio signal-processing module 230, and control the output of the audio signal by controlling the plurality of DAC output paths.

Hereinafter, the plurality of DAC paths implemented in the wearable device 201 are described.

Figure 3:
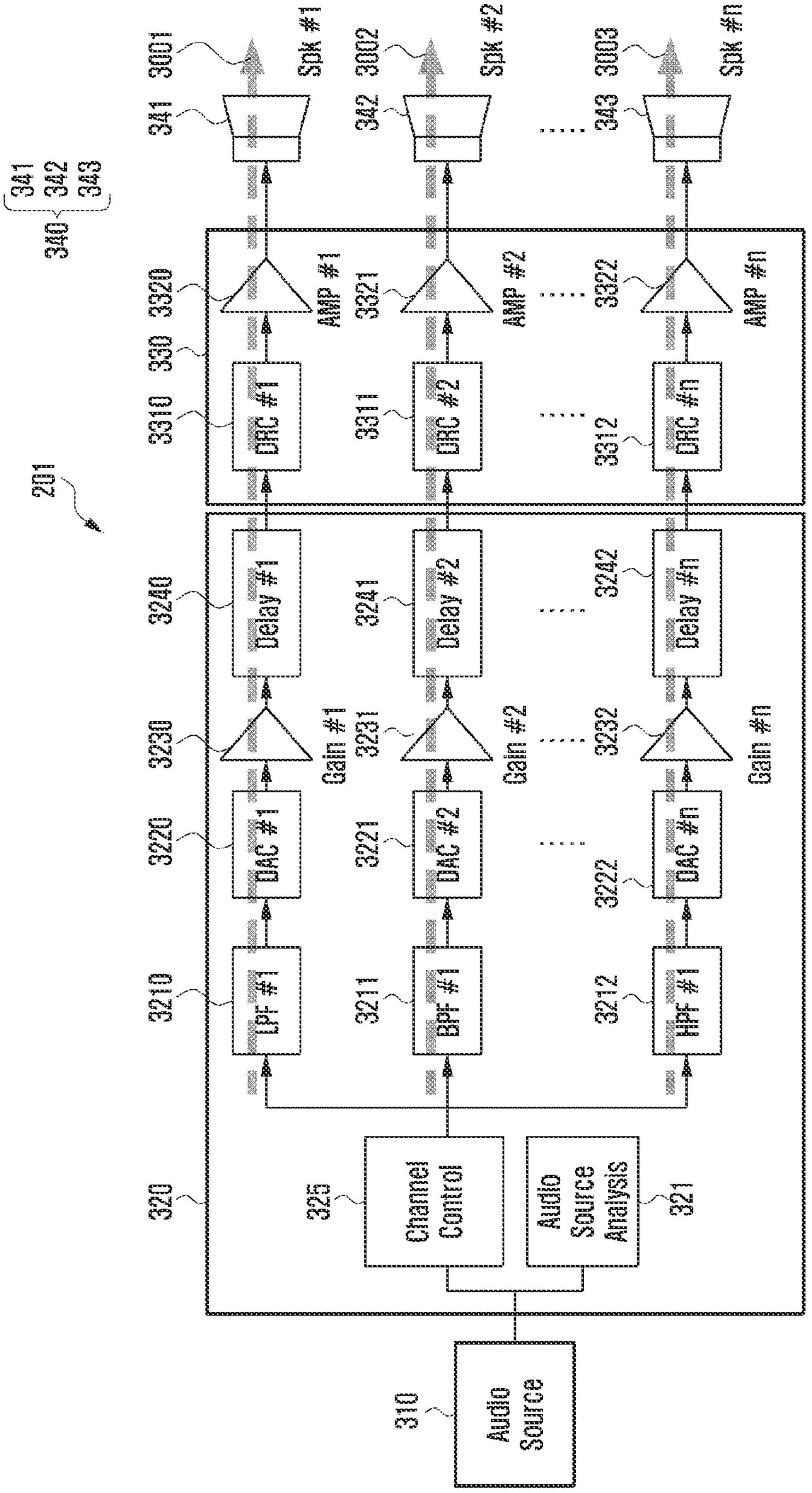
FIG. 3 illustrates a multi-DAC path in a wearable device of a multi-way scheme, according to an embodiment.

FIG. 3 illustrates a multi-DAC path in a wearable device of a multi-way scheme, according to an embodiment.

Referring to FIG. 3, a wearable device 201 including a plurality of speakers 340 having different driving conditions may include a plurality of DAC output paths 3001, 3002, and 3003 for dividing and outputting audio signals by frequency bands according to the performance of respective speakers. The wearable device 201 may separately and independently control phases, delays, and amplifications of the first DAC output path 3001, the second DAC output path 3002, and the $N^{th}$ (N being a natural number larger than 2) DAC output path 3003. The design of elements included in each DAC output path may vary depending on the performance of each speaker mounted to the wearable device 201 or an operation mode of the wearable device 201.

The wearable device 201 may receive an audio signal from an audio source 310 through a communication interface 210.

The audio signal may be transmitted to an audio signal-processing module 320 and divided for each specific frequency band according to the control of the processor 270 through the plurality of DAC output paths 3001, 3002, and 3003. The audio signals divided through the audio signal-processing module 320 may be converted and amplified via respective DACs and output through respective speakers.

The audio signal-processing module 320 may include an analysis module 321 and a channel control module 325. The analysis module 321 may analyze frequency components of the audio signal and identify an output path type according to the frequency component of the audio signal. The analysis module 321 may identify whether the output path type of the audio signal is an all-output type or a partial output type and transmit the same to the channel control module 325.

The channel control module 325 may activate all DAC output paths or at least some of the DAC output paths according to the identified output path type. The channel control module 325 may independently control the DAC output paths.

When the audio signal is the all-output path type, the channel control module 325 may activate (enable or turn on) all DAC output paths and then transmit the audio signals to respective DAC output paths. When the audio signal is the partial output path type, the channel control module 325 may activate only the DAC output path handling the frequency band corresponding to the frequency component included in the audio signal, deactivate (disable or turn off) other DAC output paths, and then transmit the audio signal to the activated DAC output path.

The plurality of DAC output paths 3001, 3002, and 3003 may be configured by a combination of the audio signal-processing module 320, the plurality of DACs 330, and the plurality of speakers 340. The plurality of DAC output paths may include the first DAC output path 3001, the second DAC output path 3002, and the $N^{th}$ DAC output path 3003.

The first DAC output path 3001 may be connected to a first band filter 3210, a first dynamic range control (DRC) 3220, a first gainer 3230, a first delay 3240, a first DAC 3310, and/or a first amplifier 3320, and may be connected to the first speaker 341.

The second DAC output path 3002 may include a second band filter 3211, a second DRC 3221, a second gainer 3231, a second delay 3241, a second DAC 3311, and/or a second amplifier 3321, and may be connected to the second speaker 342.

The $N^{th}$ DAC output path 3003 may include an $N^{th}$ band filter 3212, an $N^{th}$ DRC 3222, an $N^{th}$ gainer 3232, an $N^{th}$ delay 3242, an $N^{th}$ DAC 3312, and/or an $N^{th}$ amplifier 3322, and may be connected to the $N^{th}$ speaker 343.

The first band filter to the $N^{th}$ band filter 3210, 3211, and 3212 may divide and output the audio signal transmitted from the channel control module 325 according to frequency bands suitable for filter characteristics. The first band filter 3210 may divide the audio signal into a signal of a first frequency component corresponding to a first frequency band. The second band filter 3211 may divide the audio signal into a signal of a second frequency component corresponding to a second frequency band. The $N^{th}$ band filter 3212 may divide the audio signal into a signal of an $N^{th}$ frequency component corresponding to an $N^{th}$ frequency band.

The first to $N^{th}$ DRCs 3220, 3221, and 3222 may limit a dynamic range of the signals divided through the band filters to a predetermined level and may control a signal smaller than a preset threshold value to be larger and a signal larger than the preset threshold value to be smaller and output the controlled signals. The first DRC 3220 may control the signal of the first frequency component through the first gainer 3230 on the basis of a first threshold value configured in accordance with the performance of the first speaker 341 and then output the controlled signal. The second RC 3221 may control the signal of the second frequency component through the second gainer 3231 on the basis of a second threshold value configured in accordance with the performance of the second speaker 342 and then output the controlled signal. The $N^{th}$ DRC 3222 may control the signal of the $N^{th}$ frequency component through the $N^{th}$ gainer 3232 on the basis of an $N^{th}$ threshold value configured in accordance with the performance of the $N^{th}$ speaker 343 and then output the controlled signal.

The first delay to the third delay 3240, 3241, and 3242 may process the signals controlled through the gainers to be delayed by a desired time. The audio signal-processing module 320 may identify a delay time for each DAC output path, variably control a parameter value of the delay included in the DAC output path according to delay time difference, and simultaneously output the audio signals through the speakers.

The first to $N^{th}$ DACs 3320, 3321, and 3322 may convert the divided audio signals into analog audio signals. The first amplifier to the $N^{th}$ amplifiers 3320, 3321, and 3322 may amplify the signals output from the DACs and transmit the same to the speakers. The first speaker to the $N^{th}$ speakers 341, 342, and 343 may convert the analog audio signals transmitted through the respective DAC output paths into sound waves and output the sound waves.

The first DAC 3310 may convert the signal of the first frequency component transmitted from the first gainer 3230 into the analog audio signal and transmit the signal amplified through the first amplifier 3320 to the first speaker 341. The second DAC 3311 may convert the signal of the second frequency component transmitted from the second gainer 3231 into the analog audio signal and transmit the signal amplified through the second amplifier 3321 to the second speaker 342. The $N^{th}$ DAC 3312 may convert the signal of the $N^{th}$ frequency component transmitted from the $N^{th}$ gainer 3232 into the analog audio signal and transmit the signal amplified through the $N^{th}$ amplifier 3322 to the $N^{th}$ speaker 343.

The first to $N^{th}$ DACs 3320, 3321, and 3322 may have different processing capabilities and performances.

When the audio signal is the type for activating all output paths, the channel control module 325 may activate (enable or turn on) all DAC output paths according to the control of the processor 270. The channel control module 325 may divide the audio signal through the first DAC output path 3001, the second DAC output path 3002, and the $N^{th}$ DAC output path 3003 and then output the signal of the first frequency component to the first speaker 341, the signal of the second frequency component to the second speaker 342, and the signal of the $N^{th}$ frequency component to the $N^{th}$ speaker 343 according to the control of the processor 270.

Figure 4:
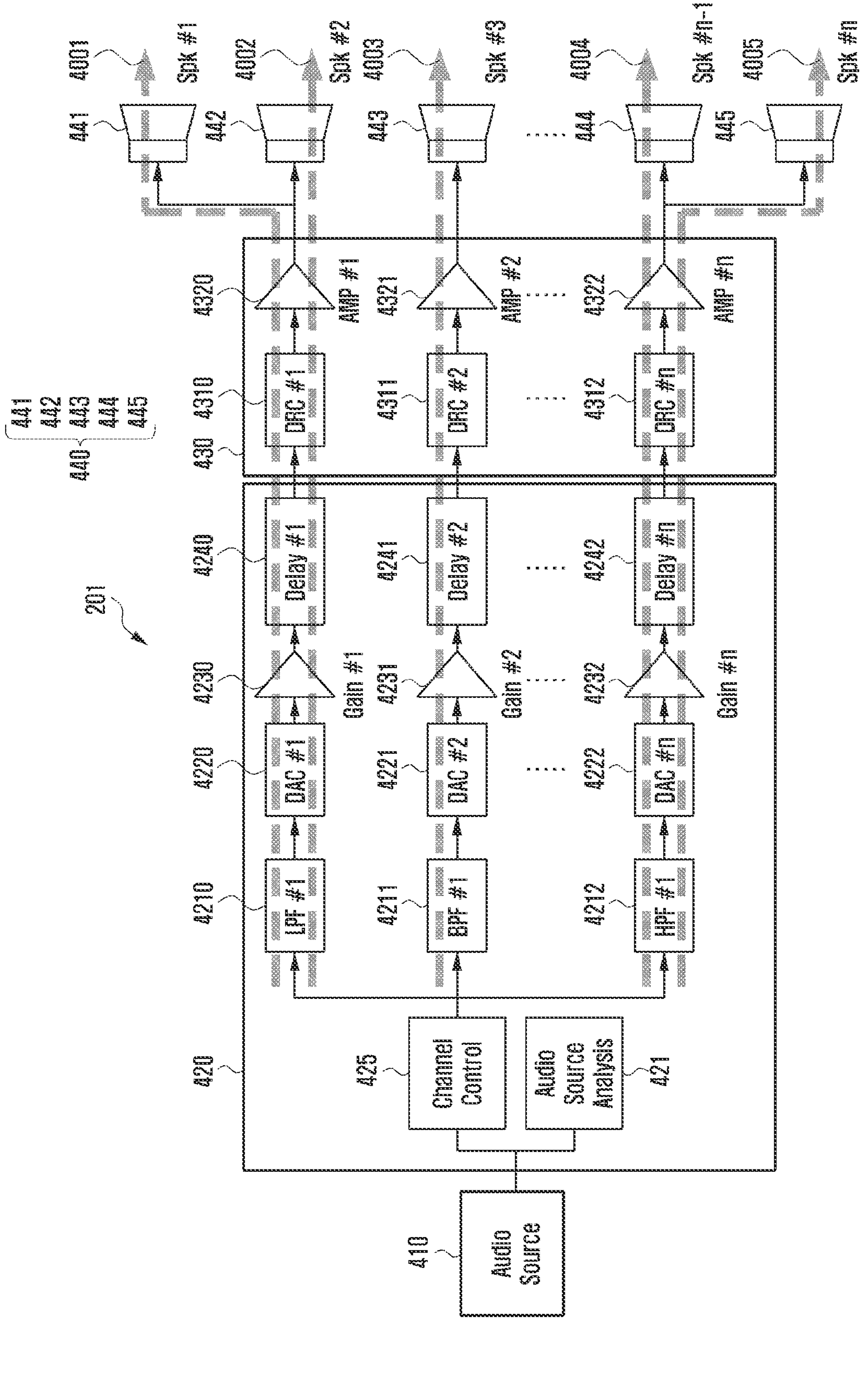
FIG. 4 illustrates a multiple DAC paths in a wearable device of a multi-way scheme, according to an embodiment.

When the audio signal is the type for partially activating the second DAC output path 3002, the channel control module 325 may activate the second DAC output path 3002 and deactivate the first DAC output path 3001 and the $N^{th}$ DAC output path 3003 according to the control of the processor 270. The channel control module 325 may transmit the audio signal to the second DAC output path 3002 and output the audio signal through the second speaker 342 according to the control of the processor 270. FIG. 4 illustrates multiple DAC paths in a wearable device of a scheme, according to an embodiment.

Referring to FIG. 4, a wearable device 201 including a plurality of speakers 440 having different driving conditions may implement a plurality of DAC output paths 4001, 4002, 4003, 4004, and 4005, but may perform implementation through the connection between one DAC and a plurality of speakers. When driving conditions of the speakers (for example, voltages) are the same and delay correction is not needed by speaker characteristics and locations within the device, the first speaker 441 and the second speaker 442 may be connected to one DAC 441 as illustrated in FIG. 4. In FIG. 4, the first speaker 441 and the second speaker 442 may be connected to the first DAC 4310, the third speaker 443 may be connected to the second DAC 4311, and the $(N-1)^{th}$ speaker 444 and the $N^{th}$ speaker 445 may be connected to the $N^{th}$ DAC 4312. In FIG. 4, since the configuration overlapping the configuration of FIG. 3 operates through the same function, a detailed description is omitted.

The first DAC output path 4001 may include a first band filter 4210, a first DRC 4220, a first gainer 4230, a first delay 4240, a first DAC 4310, and/or a first amplifier 4320, and may be connected to the first speaker 441.

The second DAC output path 4002 may include a first band filter 4210, a second DRC 4220, a second gainer 4230, a second delay 4240, a second DAC 4310, and/or a second amplifier 4320, and may be connected to the second speaker 442.

The third DAC output path 4003 may include a second band filter 4211, a second DRC 4221, a second gainer 4231, a second delay 4241, a second DAC 4311, and/or a second amplifier 4321, and may be connected to the third speaker 443.

The fourth DAC output path 4004 may include an $N^{th}$ band filter 4212, an $N^{th}$ DRC 4222, an $N^{th}$ gainer 4232, an $N^{th}$ delay 4242, an $N^{th}$ DAC 4312, and/or an $N^{th}$ amplifier 4322, and may be connected to the fourth speaker 444.

The fifth DAC output path 4005 may include the $N^{th}$ band filter 4212, the $N^{th}$ DRC 4222, the $N^{th}$ gainer 4232, the $N^{th}$ delay 4242, the $N^{th}$ DAC 4312, and/or the $N^{th}$ amplifier 4322, and may be connected to the $N^{th}$ speaker 445.

A wearable device may include a plurality of speakers including a first speaker, a second speaker, and an $N^{th}$ speaker, a plurality of DACs including a first DAC connected to the plurality of speakers, a second DAC connected to the second speaker, and an $N^{th}$ DAC connected to the $N^{th}$ speaker, an audio signal-processing module including N DAC output paths configured to filter an audio signal according to each frequency hand and output the audio signal, a memory, and a processor electrically connected to the plurality of DACs, the audio signal-processing module, and the memory, wherein the memory may include instructions causing the processor to, when the audio signal is reproduced, analyze a frequency component included in the audio signal, activate the N DAC output paths when the frequency component included in the audio signal has a full band range, activate only a DAC output path for processing a specific frequency band among the N DAC output paths when the frequency component included in the audio signal has only the specific frequency band, and output the audio signal through a speaker connected to the activated DAC output path.

A switch configured to control activation or deactivation may be disposed in each of the DAC output paths.

The memory may further include instructions causing the processor to, when the frequency component included in the audio signal has only the specific frequency band, block power supply to deactivate other DAC output paths which do not process the specific frequency band among the N DAC output paths.

The N DAC output paths may include at least one of a first DAC output path connected to a low pass filter, a second DAC output path connected to a band pass filter, a third DAC output path connected to a high pass filter, and a fourth DAC output path connected to a hand stop filter.

The wearable device may further include M DAC output paths by installing M speaker driver units, M being larger than N.

Each of the DAC output paths may further include a DRC, a gainer, a delayer, and an amplifier.

The memory may further include instructions causing the processor to individually control parameter values of the DRC, the gainer, the delayer, and the amplifier according to the activated. DAC output path.

The memory may further include instructions causing the processor to identify a delay time for each activated DAC output path and output the audio signal by variably controlling a parameter value of the delayer included in the activated. DAC output path according to difference in the delay time.

The memory may further include instructions causing the processor to identify an operation mode of the wearable device and selectively activate only a required DAC output path among the N DAC output paths.

The wearable device may further include a plurality of microphones, wherein the memory may further include instructions causing the processor to, when a noise canceling function is performed, receive a noise signal from the microphones as a reference signal for noise canceling, process noise canceling through the first DAC output path when the noise signal includes a first frequency component, and process noise canceling through the second DAC output path which is different from the first DAC output path when the noise signal includes a second frequency component.

A wearable device may include a plurality of speakers, a plurality of DACs, and an audio signal-processing module, wherein the audio signal processing module may be configured to process an audio signal, the audio signal being divided and output through a first DAC output path including a first band filter connected to a first speaker and a first DAC, a second DAC output path including a second band filter connected to a second speaker and a second DAC, and an $N^{th}$ DAC output path including an $N^{th}$ band filter connected to an $N^{th}$ speaker and an $N^{th}$ DAC, analyze a frequency component included in the audio signal, activate the N DAC output paths when the frequency component included in the audio signal has a full band range, activate only a DAC output path for processing a specific frequency band among the N DAC output paths when the frequency component included in the audio signal has the specific frequency band, and output the audio signal through a speaker connected to the activated DAC output path.

A switch configured to control activation or deactivation may be disposed in each of the DAC output paths.

The memory may further include instructions causing the processor to, when the frequency component included in the audio signal has only a specific frequency band, block a power supply to deactivate other DAC output paths which do not process the specific frequency band among the N DAC output paths.

The wearable device may further include M DAC output paths by installing M speaker driver units, M being larger than N.

Each of the DAC output paths may further include a DRC, a gainer, a delayer, and an amplifier.

The audio signal processing module may be further configured to individually control parameter values of the DRC, the gainer, the delayer, and the amplifier according to the activated DAC output path.

The audio signal processing module may be further configured to identify a delay time for each activated. DAC output path and output the audio signal by variably controlling a parameter value of the delayer included in the activated DAC output path according to a difference in the delay time.

The memory may further include instructions causing the processor to identify an operation mode of the wearable device and selectively activate only a required DAC output path among the N DAC output paths.

The wearable device may further include a plurality of microphones, wherein t audio signal-processing module may include instructions causing the processor to, when a noise canceling function is performed, receive a noise signal from the microphones as a reference signal for noise canceling, process noise canceling through the first DAC output path when the noise signal includes a first frequency component, and process noise canceling through the second DAC output path which is different from the first DAC output path when the noise signal includes a second frequency component.

Figure 5:
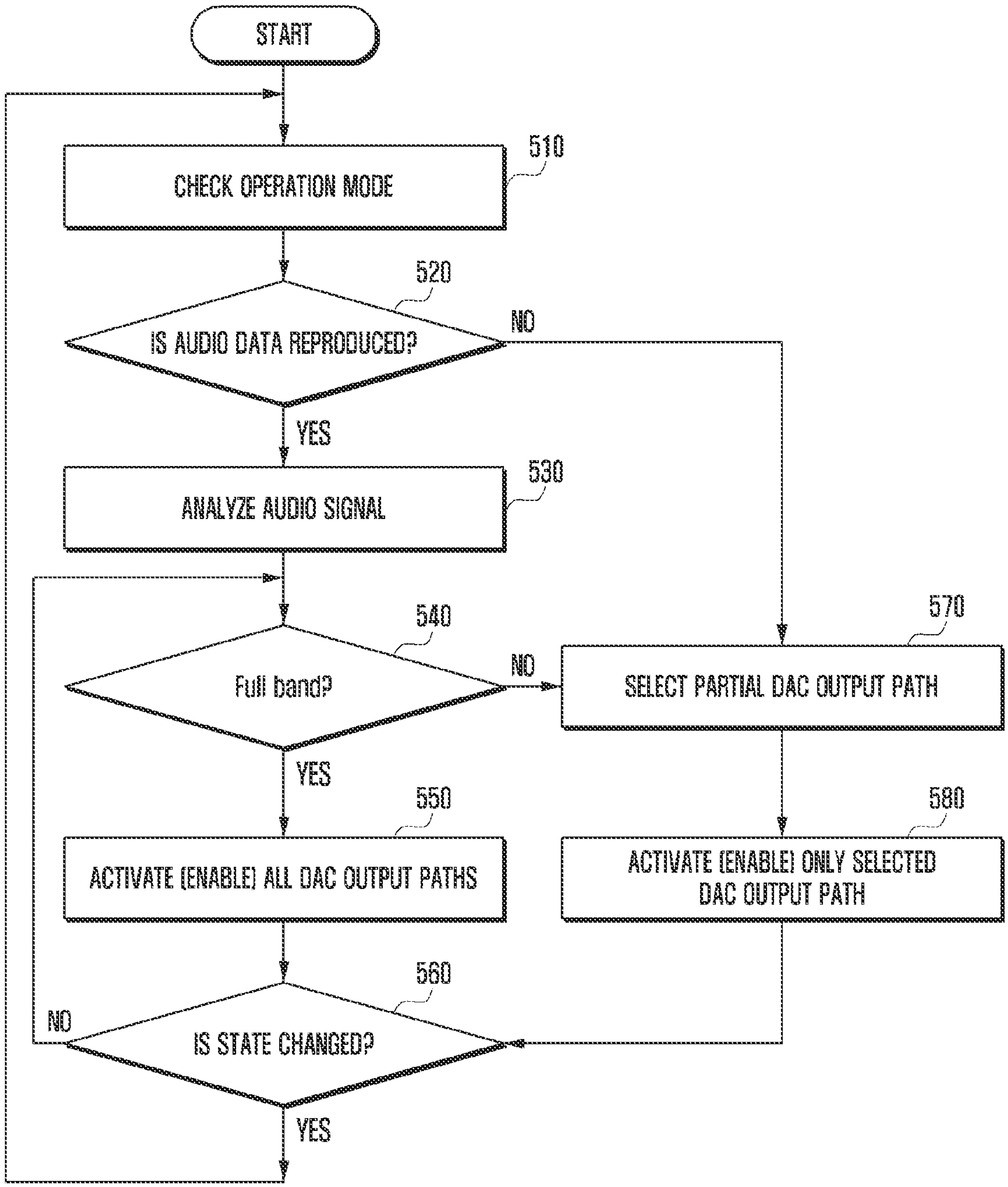
FIG. 5 illustrates a method of controlling an audio output using multiple DAC paths in a wearable device, according to an embodiment.

FIG. 5 illustrates a method of controlling an audio output using multiple DAC paths in a wearable device, according to an embodiment.

Referring to FIG. 5, the processor 270 of a wearable device 201 checks an operation mode of the wearable device in step 510. The operation mode of the wearable device 201 may include at least one of a media playback mode, a voice call mode, a noise canceling mode, and an ambient sound mode, but is not limited thereto.

The operation mode of the wearable device 201 may be changed according to a request from an external electronic device connected to the wearable device 201 or a user input making a request for configuring the mode of the wearable device 201.

In step 520, the processor 270 determines whether audio signal reproduction is requested. When an audio signal (for example, digital audio signal) is received from the external electronic device connected to the wearable device 201, a reproduction request signal is received from the external electronic device, or an input signal accepting reproduction is detected, the processor 270 may determine that the audio signal reproduction is requested. When the signal is not the audio reproduction request, in step 520, the processor 270 proceeds to step 570.

In step 530, the processor 270 analyzes a frequency component of the audio signal of which reproduction is requested.

The processor 270 may analyze the audio signal through an audio signal-processing module, divide the audio signal according to the frequency component included in the audio signal, and selectively activate a plurality of DAC output paths.

The processor 270 may analyze whether a first frequency component (for example, a low frequency band), a second frequency component (for example, an intermediate frequency band), and a third frequency component (for example, a high frequency band) are detected from the audio signal on the basis of a first reference frequency and a second reference frequency configured according to the performance of respective speakers. The processor 270 may sample at least some intervals of the audio signal and analyze the frequency component for the audio signal in the sampled intervals.

In step 540, the processor 270 determines whether frequency components detected from the audio signal are within a full band range.

When the proportion (or ratio) of the first frequency component to the third frequency component is larger than or equal to a preset value in the frequency components detected from the audio signal, the processor 270 may determine that the audio signal to be reproduced has a full band range. When the proportion of the second frequency component is larger than or equal to a preset value and the first frequency component to the third frequency component are not detected or the proportion thereof is equal to or smaller than the preset value in the frequency components detected from the audio signals, the processor 270 may determine that the audio signal has a partial band range including the second frequency component.

The processor 270 may receive type information of the audio signal from the external electronic device providing the audio signal. For example, the external electronic device may estimate type information of the audio signal on the basis of information (for example, the number of channels, a sampling rate, or a bit rate) of a source (for example, an audio file) of the audio signal and provide the estimated type information of the audio signal to the wearable device 201. The processor 270 may determine whether the audio signal to be reproduced is within the full band range or the partial band range on the basis of the type information of the audio signal transmitted from the external electronic device.

When it is determined that the audio signal is within the full band range, the processor 270 selects and activates all DAC output paths in step 550. The processor 270 may transmit the audio signal through all DAC output paths and output the audio signal through all speakers. The processor 270 may transmit the audio signal to all the activated DAC output paths, process a signal filtered to have a first frequency component through a first DAC and output the same through a first speaker, process a signal filtered to have a second frequency component through a second DAC and output the same through a second speaker, and process a signal filtered to have an $N^{th}$ frequency component through an $N^{th}$ DAC and output the same through an $N^{th}$ speaker.

The processor 270 may independently (or individually) control devices included the respective DAC output paths to individually control a gain, phase, delay, or amplification degree of the signals divided through the audio signal-processing module.

The processor 270 determines whether the state related to the audio signal or the operation mode is changed in step 560 and, when the state is changed, returns to step 510. When the state is not changed, the processor 270 returns to step 540 and maintains the output from the speaker for the audio signal.

When the audio signal is not within the full band range, the processor 270 recognizes that the audio signal is within the partial band range and selects the partial DAC output path in step 570. The processor 270 activates only the selected DAC output path in step 570. The processor 270 may transmit the audio signal through the activated. DAC output path and output the audio signal through a speaker connected to the activated DAC output path.

When the frequency component included in the audio signal contains the second frequency component, the processor 270 may activate only the second DAC output path designated to the second frequency component and deactivate the other DAC output paths (for example, first DAC output path, third DAC output path . . . $N^{th}$ DAC output path). The processor 270 may transmit the audio signal through the activated second DAC output path, process the signal filtered to have the second frequency component, and output the same through the second speaker. The wearable device 201 may improve power efficiency by blocking unnecessary output paths according to the operation mode and the situation.

Figure 6:
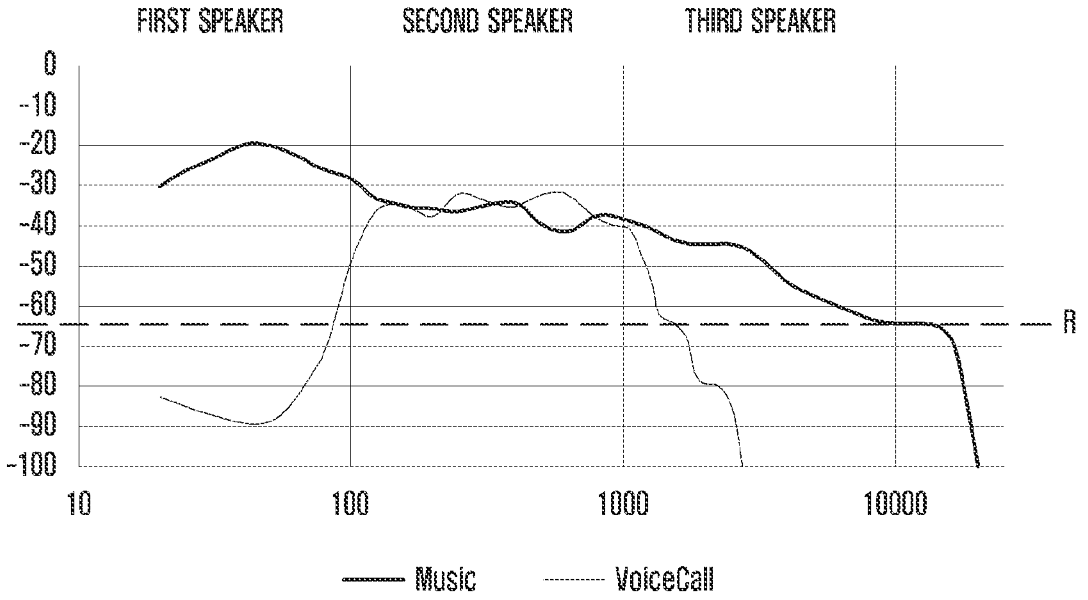
FIG. 6 illustrates speaker performance and frequency components of audio signals, according to an embodiment.

FIG. 6 illustrates the speaker performance and frequency components of audio signals, according to an embodiment.

Referring to FIG. 6, the wearable device 201 may include a first speaker, a second speaker, and a third speaker. The first speaker may be implemented as a speaker (for example, a woofer) for outputting a sound signal in a band equal to or lower than 100 Hz, the second speaker may be implemented as a speaker (for example, a mid-range) for outputting a sound signal in a band from 100 Hz to 1 kHz, and the third speaker may be implemented as a speaker (for example, a tweeter) for outputting a sound signal in a band higher than or equal to 1 kHz, but the speakers are not limited thereto. The first speaker, the second speaker, and the third speaker may be implemented as speakers having different driving conditions. A frequency component for a voice signal and a frequency component for a music signal are as shown in FIG. 6. In the voice signal, it may be noted that a frequency component in a band from 100 Hz to 1 kHz that can be output through the second speaker is larger than or equal to a threshold value R. When the audio signal includes the frequency component in the band from 100 Hz to 1 kHz like the voice signal, the wearable device 201 may activate only a DAC output path connected to the second speaker and deactivate DAC output paths connected to the first speaker and the third speaker.

However, in the music signal, it may be noted that not only a frequency component in the band equal to or lower than 100 Hz that can be output through the first speaker but also a frequency component in the band from 100 Hz to 1 kHz and a frequency component in the band higher than or equal to 1 kHz are larger than or equal to the threshold value R. When the audio signal includes frequency components in all bands like the music signal, the wearable device 201 may activate all DAC output paths connected to the first speaker, the second speaker, and the third speaker.

Figure 7:
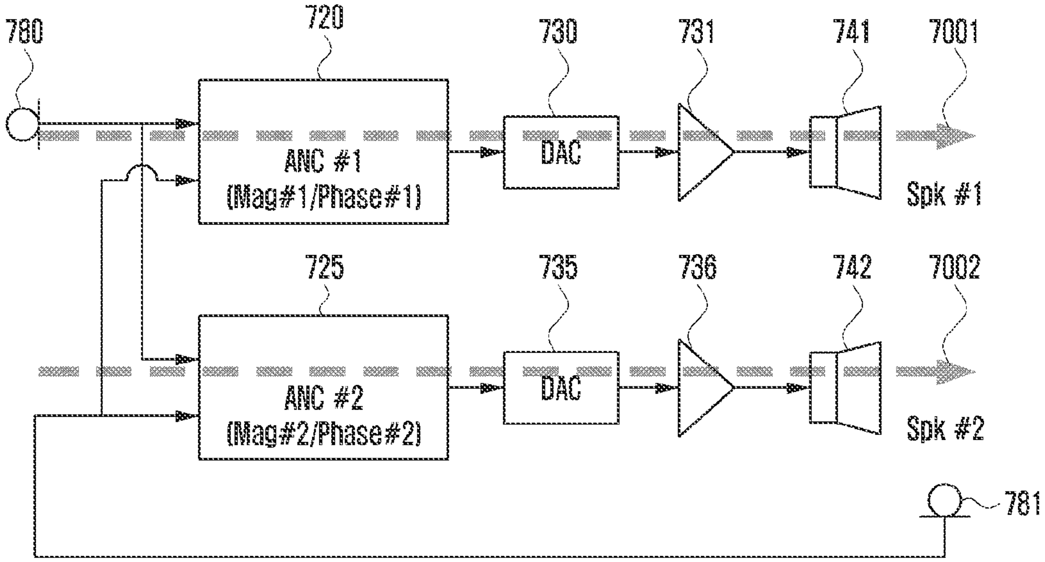
FIG. 7 illustrates a wearable device controlling DAC paths for noise canceling, according to an embodiment.

FIG. 7 illustrates a wearable device controls DAC paths for noise canceling, according to an embodiment.

Referring to FIG. 7, the wearable device 201 may include a plurality of speakers 340 having different driving conditions. In addition, the wearable device 201 may have a plurality of DAC output paths for dividing and outputting an audio signal according to frequency bands depending on the speaker performance and may support an active noise canceling (ANC) function. The plurality of speakers 340 may include different types of speaker drivers.

When operating in a noise canceling mode, the wearable device 201 may select a DAC output path according to a frequency band for noise canceling and control a latency degree of an inverse phase signal for the selected DAC output path. Although FIG. 7 illustrates two DAC output paths 7001 and 7002 for convenience of description, the number of DAC output paths may be three or four.

When latency varies depending on a speaker characteristic, a faster response speed is needed to account for latency of an earlier inverse phase signal so that the wearable device 201 may be implemented to select an optimal DAC output path for each frequency band through the configuration illustrated in FIG. 7, since a higher frequency has a shorter wavelength. When operating in the noise canceling mode, the wearable device 201 may receive a noise signal from a first microphone 780 or a second microphone 781 as a reference signal for noise canceling.

When the noise signal includes a frequency component in a low frequency band (for example, 20 to 200 Hz), the wearable device 201 may select the DAC output path 7001 for processing a low frequency band signal and apply noise canceling through a band filter and a delay 720 included in the DAC output path 7001 for processing a high frequency band signal. The noise-cancelled signal may be output to the first speaker 740 through a DAC 730 and an amplifier 731 included in the DAC output path 7001 for processing the low frequency band signal.

On the other hand, when the noise signal includes a frequency component in a high frequency band (for example, 200 Hz to 3 kHz), the wearable device 201 may select the DAC output path 7002 for processing a high frequency band signal and apply noise canceling through a band filter and a delay 725 included in the DAC output path 7002 for processing a low frequency band signal. The noise-cancelled signal may be output to the second speaker 742 though a DAC 735 and an amplifier 736 included in the DAC output path 7002 for processing the high frequency band signal.

As used in connection with various embodiments of the disclosure, the term "module" may include a unit implemented in hardware, software, or firmware, and may interchangeably be used with other terms, for example, "logic,"

"logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the above-described embodiments, it is possible to individually control DAC paths according to driving conditions of respective speakers, a use scenario, and a situation to improve the performance and efficiency of a multi-way speaker by implementing independent DAC paths according to respective speakers in a wearable device including a plurality of speakers having different driving conditions.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A wearable device comprising:

a plurality of speakers comprising a first speaker, a second speaker, and an $N^{th}$ speaker;

a plurality of digital to analog converter (DAC)s comprising a first DAC connected to the first speaker, a second DAC connected to the second speaker, and an $N^{th}$ DAC connected to the $N^{th}$ speaker;

an audio signal-processing module comprising N DAC output paths configured to filter an audio signal in respective frequency bands and output the audio signal;

a memory; and a processor electrically connected to the plurality of DACs, the audio signal-processing module, and the memory, wherein the memory comprises instructions causing the processor to, when the audio signal is reproduced, analyze a frequency component included in the audio signal, activate the N DAC output paths when the frequency component included in the audio signal has a full band range, activate only a DAC output path for processing a specific frequency band among the N DAC output paths when the frequency component included in the audio signal has only the specific frequency band, and output the audio signal through a speaker connected to the activated DAC output path.

2. The wearable device of claim 1, wherein a switch configured to control activation or deactivation is disposed in each of the DAC output paths.

3. The wearable device of claim 1, wherein the memory further comprises instructions causing the processor to, when the frequency component included in the audio signal has only the specific frequency band, block a power supply to deactivate other DAC output paths which do not process the specific frequency band among the N DAC output paths.

4. The wearable device of claim 1, wherein the N DAC output paths comprise at least one of a first DAC output path connected to a low pass filter, a second DAC output path connected to a band pass filter, a third DAC output path connected to a high pass filter, and a fourth DAC output path connected to a band stop filter.

5. The wearable device of claim 1, further comprising M DAC output paths by installing M speaker driver units, M being larger than N.

6. The wearable device of claim 1, wherein each of the DAC output paths further comprises a dynamic range control (DRC), a gainer, a delay, and an amplifier.

7. The wearable device of claim 6, wherein the memory further comprises instructions causing the processor to individually control parameter values of the DRC, the gainer, the delay, and the amplifier according to the activated DAC output path.

8. The wearable device of claim 6, wherein the memory further comprises instructions causing the processor to identify a delay time for each activated DAC output path and output the audio signal by variably controlling a parameter value of the delay included in the activated DAC output path according to a difference in the delay time.

9. The wearable device of claim 6, further comprising a plurality of microphones, wherein the memory further comprises instructions causing the processor to, when a noise canceling function is performed, receive a noise signal from the microphones as a reference signal for noise canceling, process noise canceling through the first DAC output path when the noise signal includes a first frequency component, and process noise canceling through the second DAC output path which is different from the first DAC output path when the noise signal includes a second frequency component.

10. The wearable device of claim 1, wherein the memory further comprises instructions causing the processor to identify an operation mode of the wearable device and selectively activate only a required DAC output path among the N DAC output paths.

11. A wearable device comprising:

a plurality of speakers;

a plurality of digital to analog converters (DAC)s; and an audio signal-processing module, wherein the audio signal-processing module is configured to process an audio signal, the audio signal being divided and output through a first DAC output path comprising a first band filter connected to a first speaker and a first DAC, a second DAC output path comprising a second band filter connected to a second speaker and a second DAC, and an $N^{th}$ DAC output path comprising an $N^{th}$ band filter connected to an $N^{th}$ speaker and an $N^{th}$ DAC, analyze a frequency component included in the audio signal, activate the N DAC output paths when the frequency component included in the audio signal has a full band range, activate only a DAC output path for processing a specific frequency band among the N DAC output paths when the frequency component included in the audio signal has the specific frequency band, and output the audio signal through a speaker connected to the activated DAC output path.

12. The wearable device of claim 11, wherein a switch configured to control activation or deactivation is disposed in each of the DAC output paths.

13. The wearable device of claim 11, wherein the audio signal-processing module is further configured to, when the frequency component included in the audio signal has only a specific frequency band, block a power supply to deactivate other DAC output paths which do not process the specific frequency band among the N DAC output paths.

14. The wearable device of claim 11, further comprising M DAC output paths by installing M speaker driver units, M being larger than N.

15. The wearable device of claim 11, wherein each of the DAC output paths further comprises a dynamic range control (DRC), a gainer, a delay, and an amplifier.

16. The wearable device of claim 15, wherein the audio signal-processing module is further configured to individually control parameter values of the DRC, the gainer, the delay, and the amplifier according to the activated DAC output path.

17. The wearable device of claim 16, wherein the audio signal-processing module is further configured to identify a delay time for each activated DAC output path and output the audio signal variably controlling a parameter value of the delay included in the activated DAC output path according to a difference in the delay time.

18. The wearable device of claim 16, further comprising plurality of microphones, wherein the audio signal-processing module is further configured to, when a noise canceling function is performed, receive a noise signal from the microphones as a reference signal for noise canceling, process noise canceling through the first DAC output path when the noise signal includes a first frequency component, and process noise canceling through the second DAC output path which is different from the first DAC output path when the noise signal includes a second frequency component.

19. The wearable device of claim 11, wherein the audio signal-processing module is further configured to identify an operation mode of the wearable device and selectively activate only a required DAC output path among the N DAC output paths.

* * * * *